(12) United States Patent
Mann et al.

(10) Patent No.: US 11,308,950 B2
(45) Date of Patent: Apr. 19, 2022

(54) PERSONAL LOCATION SYSTEM FOR VIRTUAL ASSISTANT

(71) Applicant: 4PLAN Corporation, Westmont, IL (US)

(72) Inventors: Parminder Mann, Algonquin, IL (US); Gerard Rizkallah, Glenview, IL (US); Firass Badaruzzaman, Westmont, IL (US)

(73) Assignee: 4PLAN Corporation, Westmont, IL (US)

( * ) Notice: Subject to any disclaimer, the term of this patent is extended or adjusted under 35 U.S.C. 154(b) by 223 days.

(21) Appl. No.: 16/406,227

(22) Filed: May 8, 2019

(65) Prior Publication Data

US 2019/0348040 A1    Nov. 14, 2019

Related U.S. Application Data

(60) Provisional application No. 62/668,974, filed on May 9, 2018.

(51) Int. Cl.
| | | |
|---|---|---|
| *G10L 15/22* | (2006.01) | |
| *G10L 15/30* | (2013.01) | |
| *H04L 67/10* | (2022.01) | |
| *H04W 4/029* | (2018.01) | |

(52) U.S. Cl.
CPC ............ *G10L 15/22* (2013.01); *G10L 15/30* (2013.01); *H04L 67/10* (2013.01); *H04W 4/029* (2018.02)

(58) Field of Classification Search
CPC ........ G10L 15/22; G10L 15/30; H04W 4/029; H04L 67/10
See application file for complete search history.

(56) References Cited

U.S. PATENT DOCUMENTS

| | | | |
|---|---|---|---|
| 8,026,814 B1 | 9/2011 | Heinze et al. | |
| 9,471,900 B1* | 10/2016 | Boustany | ............ G06Q 10/1091 |
| 9,672,346 B2 | 6/2017 | Jarvis et al. | |
| 9,788,167 B2 | 10/2017 | Geng et al. | |
| 10,405,146 B1* | 9/2019 | Kuruvilla | ............... H04W 4/021 |
| 2006/0270421 A1* | 11/2006 | Phillips | ............... G08B 21/0261 |
| | | | 455/457 |
| 2009/0048821 A1* | 2/2009 | Yam | .................... G06F 3/04842 |
| | | | 704/3 |
| 2009/0213009 A1* | 8/2009 | Ishiwatari | ............... G01S 5/021 |
| | | | 342/450 |
| 2009/0322513 A1* | 12/2009 | Hwang | ................ G08B 25/016 |
| | | | 340/539.12 |
| 2010/0134276 A1 | 6/2010 | Zaruba et al. | |

(Continued)

FOREIGN PATENT DOCUMENTS

| | | |
|---|---|---|
| CN | 105873023 | 8/2016 |
| WO | 2018005684 | 1/2018 |

*Primary Examiner* — Huyen X Vo
*Assistant Examiner* — Athar N Pasha
(74) *Attorney, Agent, or Firm* — Boyle Fredrickson S.C.

(57) ABSTRACT

A beacon system is used to monitor the location and identity of individuals using stationary sniffers and to provide that information to a virtual assistant for improved functionality and better context derived from location with respect to standard virtual assistant queries. The system provides a heuristic mapping process providing increasingly precise mapping of the individual with minimal consumer input.

17 Claims, 5 Drawing Sheets

(56) References Cited

U.S. PATENT DOCUMENTS

| | | | |
|---|---|---|---|
| 2010/0302143 A1* | 12/2010 | Spivack | A63F 13/216 |
| | | | 345/157 |
| 2015/0079942 A1* | 3/2015 | Kostka | G06Q 30/0267 |
| | | | 455/411 |
| 2015/0256665 A1* | 9/2015 | Pera | H04M 1/72415 |
| | | | 455/420 |
| 2016/0005284 A1 | 1/2016 | Batra et al. | |
| 2016/0047648 A1* | 2/2016 | Edge | H04W 4/025 |
| | | | 455/73 |
| 2016/0165387 A1 | 6/2016 | Nhu | |
| 2016/0292665 A1* | 10/2016 | Blanchard | H04W 4/02 |
| 2017/0148196 A1 | 5/2017 | Muraoka et al. | |
| 2017/0374641 A1 | 12/2017 | Batra et al. | |
| 2018/0233145 A1* | 8/2018 | Bathiche | G06T 7/248 |

\* cited by examiner

PERSONAL LOCATION SYSTEM FOR VIRTUAL ASSISTANT

CROSS REFERENCE TO RELATED APPLICATION

This application claims the benefit of U.S. Provisional Application No. 62/668,974, filed May 9, 2018 hereby incorporated by reference.

BACKGROUND OF THE INVENTION

The present invention relates generally to virtual assistants, for example, including Amazon Alexa, Google Home and Apple HomePod, and in particular to a personal location system that can be used with such virtual assistants.

Virtual assistants, also termed voice-controlled speaker systems, provide a computerized speaker and microphone connected to a remote, typically cloud-based computer system. The virtual assistant provides a simple way for home users to access Internet services such as streamed music, news, and search engines. These services may also include the ability to make purchases and interact with home automation, for example, sending music or media to a connected television or similar device. Such virtual assistants may include remote speaker microphone satellites allowing the virtual assistant to be used in a variety of locations within the home.

SUMMARY OF THE INVENTION

The present invention greatly expands the capabilities of the virtual assistant by providing a locational context and identification of the user(s) within a residence or establishment. This location and identification information is obtained using a simple beacon system (avoiding the need for the user to carry and access a cell phone) and with minimal setup and configuration by the user.

Generally, the user carries a unique lightweight beacon with long life batteries that can be incorporated into wristbands, wristwatches, or other common articles conveniently and commonly carried by a user. A set of stationary "sniffers" track these beacons and provide automatic mapping functionality to inform requests made to the virtual assistant with the additional dimension of location information. The sniffers may be connected to a line power to have greater range and greater computational ability. The resulting location data permits improved assistance from the virtual assistant as well as enabling new virtual assistant "skills" such as those that require this location information.

In one embodiment the present invention is a virtual assistant system including a virtual assistant providing audio communication in an area with a user through a microphone and speaker and communicating over the Internet with a remote server to receive requests for information from the user through the microphone and to communicate with the remote server to provide responsive information to the user through the speaker. A sensor system identifies the location of the user within the area and provides location information or trajectory information to the virtual assistant. The virtual assistant uses the location information or trajectory information together with the requests through the microphone to respond to user queries.

It is thus a feature of at least one embodiment of the present invention to incorporate location and mapping services to virtual assistant functionality by providing location and identification information to the virtual assistant.

The sensor system may include at least one sniffer having a transceiver receiving signals indicating the location or the trajectory of the user.

It is thus a feature of at least one embodiment of the present invention to provide user location or trajectory information through strategically installed sniffers in each room.

The sensor system may include at least one central interface communicating with the at least one sniffer, wherein the central interface has a processor communicating with the transceiver and the virtual assistant and a memory communicating with the processor and holding a program executable by the processor to identify the location or the trajectory of the user based on the signals and to provide the location or trajectory data to the virtual assistant.

It is thus a feature of at least one embodiment of the present invention to provide a communication interface between the sensor system and a virtual assistant placed within the space.

The at least one sniffer may include at least one sensor selected from a microphone, a light sensor, a passive infrared sensor, an active infrared sensor, and an environmental sensor detecting at least one of a temperature, barometric pressure, air quality and humidity.

It is thus a feature of at least one embodiment of the present invention to provide automatic sensing abilities by sniffers within each room providing automatic mapping of each room without requiring the user to input detailed floor plan information.

The program executable by the processor may identify the location of the user based on a change in at least one of a temperature, barometric pressure, air quality and humidity from the sensor of the at least one sniffer. The program executable by the processor may identify the location of the user based on voice signals from the microphone of the at least one sniffer.

It is thus a feature of at least one embodiment of the present invention to allow for the detection of users within the area without the use of beacons worn by the user.

The at last one sniffer may include an identification indicating a location of each sniffer and recognizable by the virtual assistant.

It is thus a feature of at least one embodiment of the present invention to provide additional information to area mapping and to allow the user to make queries relating to location using the sniffer names such as "which room are the user's keys".

The sensor system may further comprise a beacon adapted to be carried by the user or an object delivering a predetermined signal strength measurable by the sniffers to deduce distance. The signal may be a Bluetooth signal.

It is thus a feature of at least one embodiment of the present invention to improve location and trajectory information for the user using measurable signal strength where stationary room sniffers receive location and trajectory information from dynamic, mobile beacons moving within the room.

The beacon may transmit an identification signal to the sniffers indicating an identity of the user or object carrying the beacon and recognizable by the virtual assistant.

It is thus a feature of at least one embodiment of the present invention to provide identification of the user by name and to allow the user to make queries relating to the identity of the user or object carrying the beacon.

The beacon may further include at least one of an accelerometer and a gyroscope wherein the program identifies the location of the beacon by inertial guidance using signals of the at least one accelerometer and gyroscope.

It is thus a feature of at least one embodiment of the present invention to formulate trajectory information so that the sensor system may anticipate user movements within the space and also to facilitate mapping of the room environment.

The beacon may further include an environmental sensor detecting at least one of a temperature, barometric pressure, air quality, and humidity wherein the program identifies the location of the beacon using predictive algorithms based on a change in at least one of a temperature, barometric pressure, air quality and humidity.

It is thus a feature of at least one embodiment of the present invention to anticipate changes in room conditions based upon anticipated user trajectory.

The sensor system may generate a mapping of the area with respect to the virtual assistant based on the location or trajectory data of the user.

It is thus a feature of at least one embodiment of the present invention to provide automatic mapping of the room or space without the need for a large amount of user input during set up.

The at least one sniffer may be positioned in an electrical switch or outlet plates and connectable to a local electrical power line.

It is thus a feature of at least one embodiment of the present invention to utilize convenient access to local electrical line power eliminating the need for batteries and providing easy installation by a user.

An alternative embodiment of the present invention provides a method of using a virtual assistant including using a sensor system to locate the user within the area and to provide information to the virtual assistant about a location or a trajectory of the user within the area; receiving by the virtual assistant a request for information by a user through an microphone of the virtual assistant; combining the request for information by the user with location or trajectory from the sensor system to create an augmented request for information; and responding to the augmented request for information by the virtual assistant.

The method may also include using the sensor system to map the area based on the location or the trajectory of the user within the area; and receiving by the virtual assistant a request for information by the user through the microphone of the virtual assistant; combining the requests for information by the user with the mapping of the area to create an augmented request for information; and responding to the augmented request for information by the virtual assistant.

The method may also include receiving by the virtual assistant a request as to the location of the user or an object within the area by the user through the microphone of the virtual assistant; and responding to the request for information by the virtual assistant.

The method may also include providing automatic alerts by the virtual assistant based on trigger events combining location or trajectory from the sensor system and a user identity.

An alternative embodiment of the present invention provides a mapping system adapted to communicate with a virtual assistant providing audio communication in an area with a user through a microphone and speaker and communicate over the Internet with a remote server to receive requests for information from the user through the microphone and to communicate with the remote server to provide responsive information to the user through the speaker comprising: a sensor system for identifying the location of the user within the area and providing location information or trajectory information to the virtual assistant including at least one sniffer having a transceiver adapted to receive signals indicating the location or the trajectory of the user; and a central interface having a processor communicating with the transceiver and the virtual assistant and a memory communicating with the processor and holding a program executable by the processor to identify the location or the trajectory of the user based on the signals and to provide the location or trajectory data to the virtual assistant whereby the virtual assistant uses the location information or trajectory information together with the requests through the microphone to respond to user queries.

These particular objects and advantages may apply to only some embodiments falling within the claims and thus do not define the scope of the invention.

DETAILED DESCRIPTION OF THE PREFERRED EMBODIMENT

Figure 1:
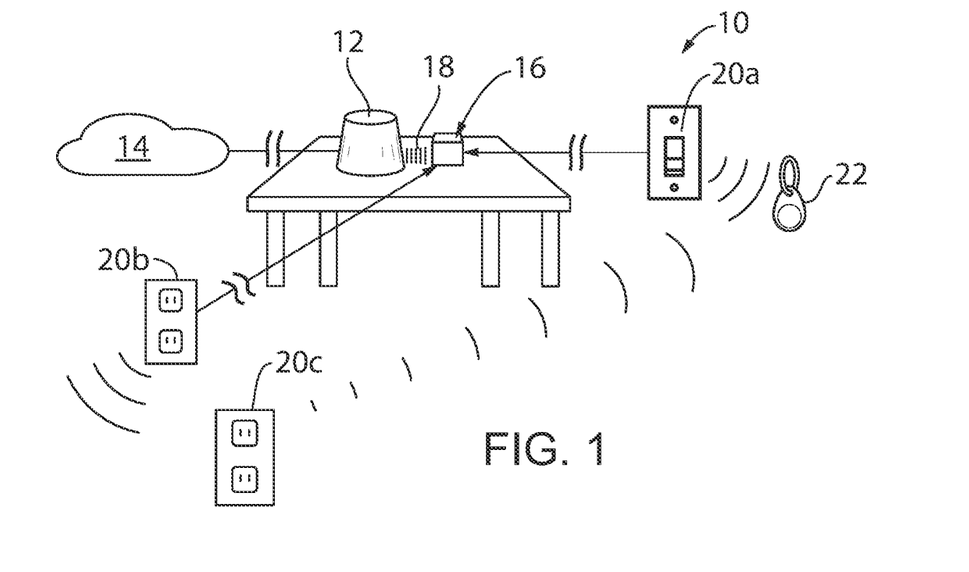
FIG. 1 is a fragmentary, perspective view of a virtual assistant associated with a hub of the present invention, the latter of which can communicate with multiple stationary sniffers through a network topology such as a mesh or star network to detect the location of one or more beacons assigned to objects, pets, or people.

Referring now to FIG. 1, a location-informed virtual assistant system 10 may include a virtual assistant 12, for example, such as are commercially available under the trade names of Amazon Alexa, Google Home and Apple HomePod among others. Such virtual assistants 12 provide voice-activated speakers communicating with the Internet 14 to provide a ready access by a user to Internet services and information through audio communication. Normally, the virtual assistant 12 will be centrally located at a particular location in a home; however, the virtual assistant 12 may include various remote microphone speaker satellites (not shown) to allow vocal communication from other locations to be received by the virtual assistant 12.

The present invention provides a hub 16 that may communicate with a virtual assistant 12, for example, by a local Bluetooth connection 18 and which may communicate with one or more stationary sniffers 20a, 20b, and 20c (only three shown for clarity). It is contemplated that all or some of the functions provided by the hub 16 may in fact be incorporated into the virtual assistant 12 at some time.

The sniffers 20 may be provided in common residential electrical form factors, for example, in the form of an electrical switch as shown by sniffer 20*a* or in the form of electrical outlets per sniffers 20*b* and 20*c*. In that respect, the sniffers 20 have convenient access to local electrical line power to eliminate the need for batteries; however, battery systems are possible and may be used for backup and temporary power. In one embodiment, sniffers 20 may be based on the commercially available Nordic Thingy manufactured by Nordic Semiconductor of Norway. It is contemplated that some or all of the functions of the sniffers 20 may also be incorporated into the hub 16 so that the hub 16 may also act as a sniffer 20.

Each of the sniffers 20 may communicate with a one or more Bluetooth beacons 22 uniquely identifying that beacon 22 and locating that beacon as will be discussed. Generally, Bluetooth beacons 22 have limited functionality other than communicating with a sniffer 20 and may be lightweight and have long life batteries. Such beacons may conform to Bluetooth low energy standards managed by the Bluetooth Special Interest Group, a nonprofit corporation headquartered in Kirkland, Wash., and are hereby incorporated by reference.

Figure 2:
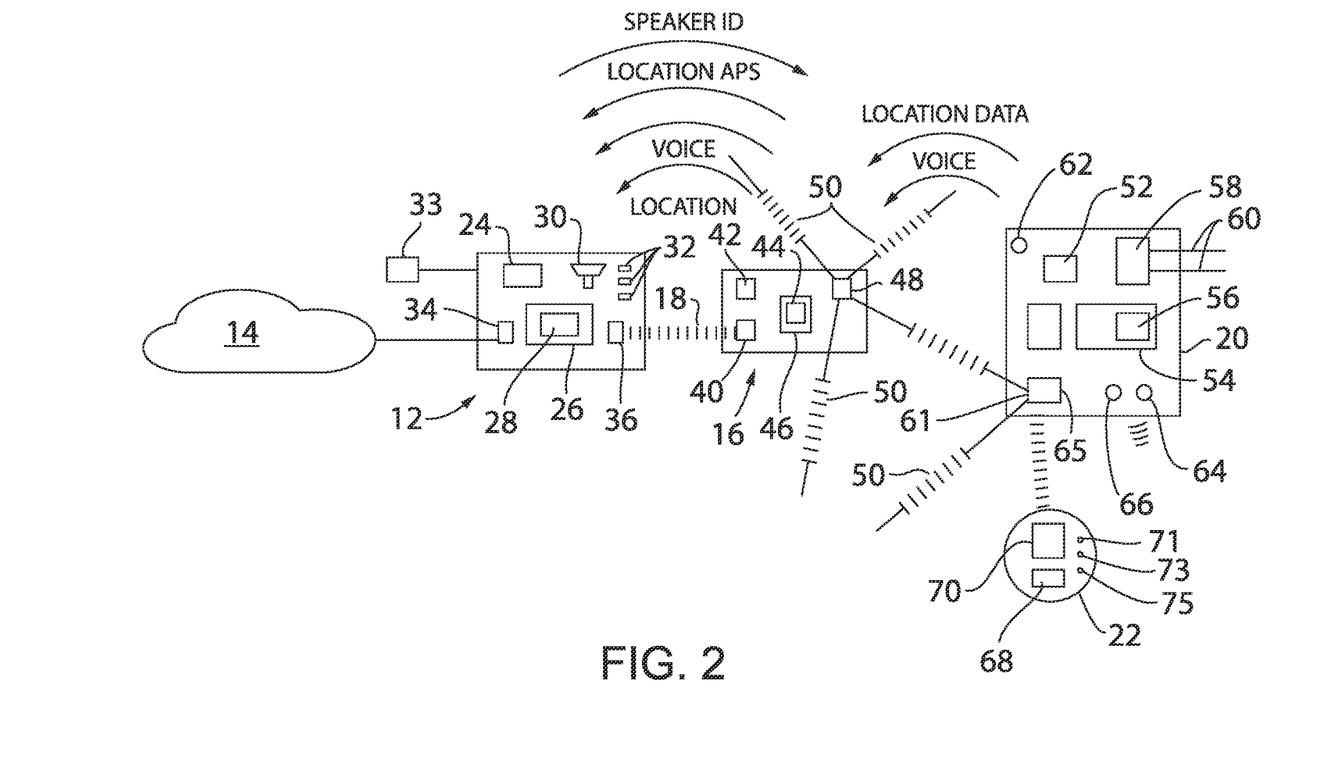
FIG. 2 is a block diagram of the system of FIG. 1 showing the components of each of the virtual assistant, hub, sniffers, and beacon.

Referring now to FIG. 2, generally the virtual assistant 12 will include a processor 24 communicating with a memory 26, the latter holding a stored program 28 allowing for local speech generation and speech capture through the use of a speaker 30 and one or more microphones, for example, in a microphone array 32. The virtual assistant 12 may also allow for optional or triggered video capture through the use of a camera 33 communicating with the virtual assistant 12. The virtual assistant 12 may include Internet port 34 providing a connection to the Internet 14 (wired or wireless) and in particular to Internet services including, for example, speech recognition engines, speech synthesis engines (to which the virtual assistant 12 provides a local presence), facial or object recognition engines, as well as query engines and Internet applications. It will be appreciated that the present invention is not limited to particular Internet technology communicating with the virtual assistant and generally also contemplates use with artificial intelligence systems, for example, such as may generate queries or perform other activities associated with use of the virtual assistant.

The virtual assistant 12 may also provide for local communication through port 36 (for example, wired, optical, or radio) with the hub 16 having a corresponding port 40 communicating with the port 36 of the virtual assistant 12 to exchange data therewith. This port 40 may communicate internally with a processor 42 executing a stored program 44 contained in a memory 46 of the hub 16. The processor 42 may also communicate with a Bluetooth transceiver 48 (which may be combined with port 40 when the virtual assistant 12 and hub 16 communicate via Bluetooth) allowing the hub 16 to implement a network topology such as mesh communications 50 with one or more of the sniffers 20. Other network topologies capable of being used by the hub 16 in a similar manner include star, ring, bus, tree, and hybrid communications.

Each sniffer 20 also includes a processor 52 communicating with a memory 54 holding a stored program 56 as will be described. The sniffer 20 may include a power module 58 for receiving line power 60 and converting it to the power levels (e.g., low-voltage DC) suitable for powering the rest of the sniffer 20 to eliminate the need for batteries. Nevertheless sniffer 20 may provide for short-term power through small batteries or capacitors to allow the sniffer 20 to be programmed or paired at a point near the hub 16 and then moved to its stationary position without losing power.

The sniffer 20 further includes a Bluetooth transceiver 61 communicating with the processor 52 for joining the mesh communications 50 described above. The sniffer 20 may also include multiple sensors including a microphone 62 for detecting environmental noise, a light sensor 65 detecting room lighting or the like, a passive infrared sensor 64 for detecting the presence of an individual proximate to the sniffer 20 by body heat, and active infrared sensors using an infrared beam and infrared detector, for example, to measure proximity or distance by reflected light intensity or time of flight detection, as well as an environmental sensor array 66 including temperature, barometric pressure, air quality and humidity detection. Each of the sensors can be used to inform an automatic mapping process as will be discussed.

The beacons 22 also include dedicated microprocessor and firmware incorporated into a beacon circuit 70 associated with a long-life battery 68 providing a low-energy Bluetooth beacon functionality. Circuitry for beacons 22 suitable for this purpose are commercially available under the tradename Eddystone from Google of California.

The beacons 22 may also include multiple sensors including an environmental sensor array 71 including temperature, barometric pressure, air quality (particulate or smoke sensing, volatile organic compounds, carbon dioxide, carbon monoxide and nitrous oxides) and humidity detection to assist with user tracking. The beacons 22 may also include a gyroscope 73 and an accelerometer such as a multi-axis accelerometer 75 providing, for example, accelerometers along three Cartesian coordinates together with rotational accelerometers or gyroscopes to provide navigational cues, for example, through dead reckoning, software/machine learning algorithms, tri-lateralization or other navigational techniques using the accelerometer and rotational gyroscope from a previously located position to provide dynamic tracking of the user as will be discussed. The sensors may be low power micro-electro-mechanical system (MEMS) sensors providing low-energy functionality.

As will be discussed in greater detail below, generally, the virtual assistant 12, hub 16, and sniffers 20 operate together to determine the location and provide this location information to the virtual assistant 12 or to use this to develop new virtual assistant skills partially implemented by the virtual assistant 12. In this regard, the beacons 22 may provide a known transmitter power in signals communicated to the sniffers 20. The sniffers may then communicate raw location data including signal strength from the sniffer sensors to the hub where it is converted to location information provided to the virtual assistant 12, for example, by push notification. The hub 16 may also process the location information to execute one or more location skills which may be communicated to the user through the virtual assistant 12 as will be discussed below. The hub 16 may also process environmental data and navigation cues from the beacons 22 to provide dynamic tracking of the user's movements provided to the virtual assistant 12. The virtual assistant 12 may be used to identify spoken words received from the microphone 62 in the sniffers 20 and may relay the specification information abstracted from the actual voice message to the hub 16 to further help in identifying the location of individuals in proximity to the sniffers 20.

Together with the location, the virtual assistant 12, hub 16, and sniffers 20 may also operate together to determine the identity or to distinguish the identity of multiple users or objects in the room and provide this identity information to the virtual assistant 12 or to use this to develop new virtual assistant skills partially implemented by the virtual assistant 12. In this regard, the beacons 22 may provide a unique user or object identification from the sniffer sensors to the hub 16 where it is converted to identity information provided to the virtual assistant 12, for example, by push notification. The virtual assistant 12 may also be used to identify spoken words received from the microphone 62 in the sniffers 20 and may relay the identity information abstracted from the actual voice message to the hub 16 to further help in identifying individuals in proximity to the sniffers 20. The virtual assistant 12 may also be used to identify images received by the camera 33 and may relay the identity information abstracted from the images to the hub 16 to further help in identifying individuals, for example, when users are not wearing beacons 22 and cannot be identified by identity information through the beacons 22 and/or voice identification through the microphone 62. The camera 33 may only be activated when there is an unidentified individual in the room to prevent the camera 33 from receiving images without user permission to ensure a sense of privacy.

Figures 3, 4:
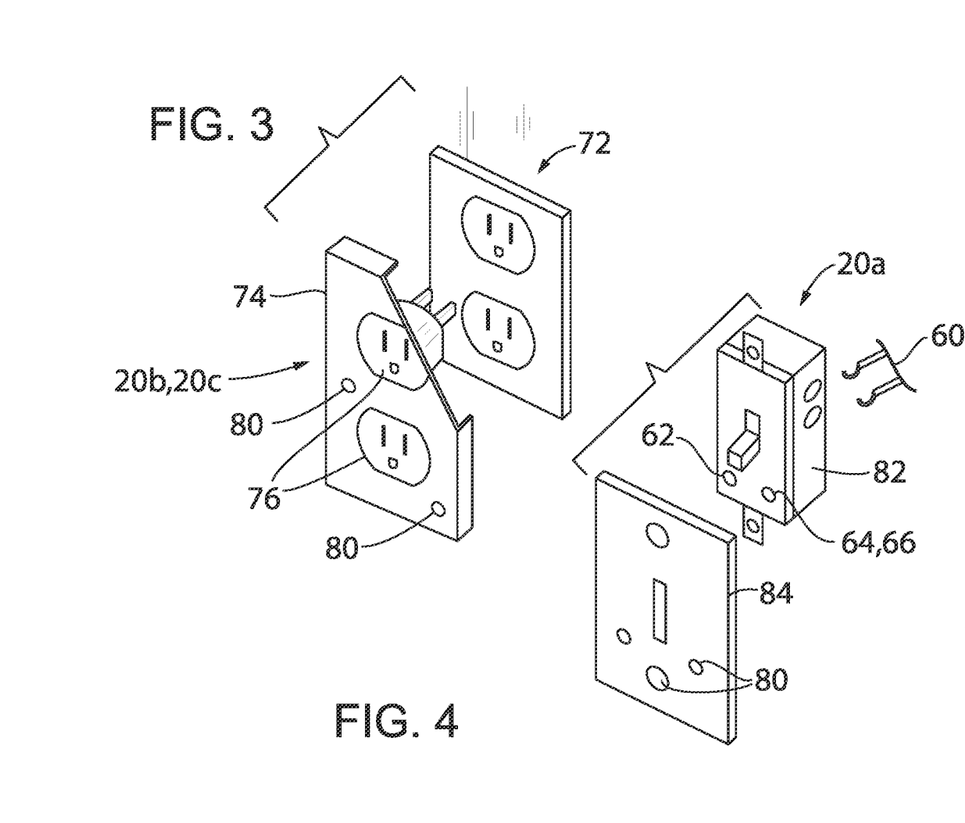
FIG. 3 is an exploded fragmentary view of a housing system for a sniffer-emulating electrical outlet.
FIG. 4 is a figure similar to FIG. 3 showing a sniffer incorporated into a standard power switch.

Referring now to FIGS. 2 and 3 the sniffers 20 may, for example, be incorporated into common residential components, for example, an electrical outlet 72. In this case the sniffer 20 may be built into dummy outlet plates 74 plugging into the electrical outlet 72 to receive power therefrom and to pass that power through front connectors 76 on the dummy outlet plates 74 that may also receive appliance cords and the like to pass electrical power to those appliance cords in the manner of a conventional outlet 72. This approach provides extremely simple installation by a consumer who merely plugs in the dummy outlet plates 74 to the electrical outlet 72. A small portion of the line power 60 received by the dummy outlet plates 74 is used to power the sniffer 20. The dummy outlet plate 74 may further include openings 80 exposing the various sensors including but not limited to the microphone 62, passive infrared detector 64, and the environmental sensors 66.

Alternatively, the circuitry of the sniffer 20 may be built into a connector of the outlet 72 directly and used to replace the connector of the pre-existing outlet 72.

Referring now to FIG. 4, in yet a further embodiment the circuitry of the sniffer 20 may be incorporated into a special electrical switch 82, for example, a single pole single throw switch, or single pole double throw switch, or dimmer switch for handling the switching of line power 60 to residential lighting or the like. In this case, the pre-existing electrical switch found in the residence is replaced by the special electrical switch 82 and a cover plate 84, the latter providing openings 80 exposing various sensors 62, 64, and 66. Again, electrical power necessary for the circuitry of the sniffer 20 is scavenged from the line power 60 attached to the switch 82 as well as provides normal functioning of the switch 82. Power may be scavenged between the hot side of the switching ground or as a voltage difference across the switch when the switch is open or through use of a small transformer winding when the switch is closed.

Figure 5:
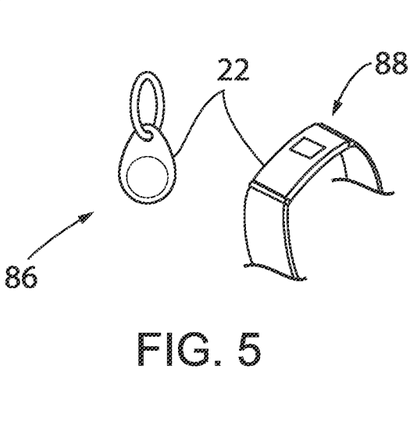
FIG. 5 perspective view of two beacons, one in the configuration of a fob and the other in the form of a wristband.

Referring to FIG. 5, the beacons 22, as noted, may be incorporated into any small form factor that can be conveniently carried by the user anywhere on the user's person as there is no need for the user to interact with the beacon 22 during use. Two possible embodiments include a simple fob 86 like a key fob, or a wristband or wristwatch 88 that may be conveniently carried around the house. In some embodiments, it may be desired that that the beacons 22 be exposed to the environment to allow the environmental sensor array 71 to sense the surroundings proximate the user.

Figure 6:
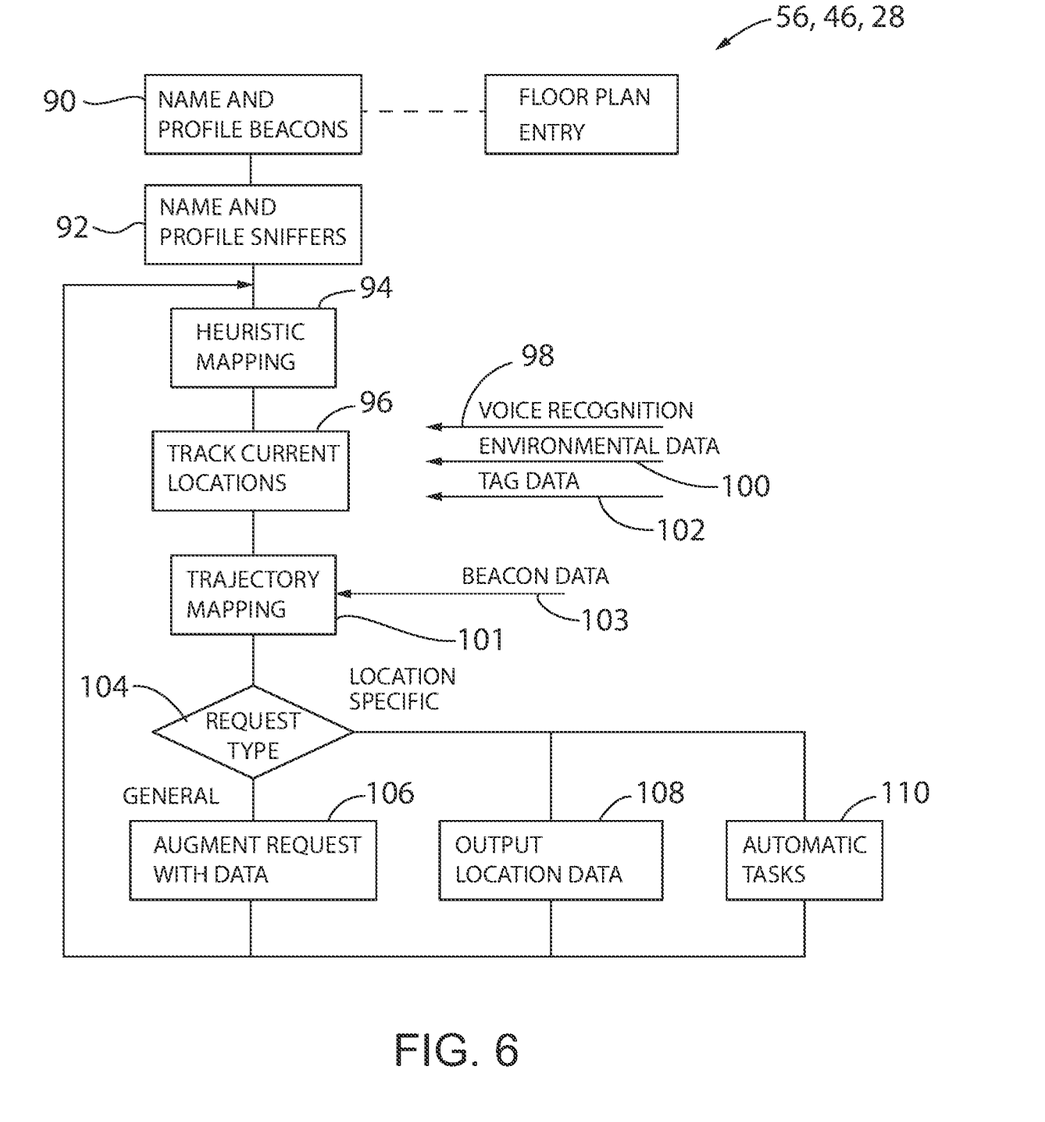
FIG. 6 is a flowchart of the principal program steps implemented in distributed fashion by one or more of the devices of the virtual assistant, hub, and sniffers including a heuristic mapping process.

Referring now to FIG. 6, the various components of the location-informed virtual assistant system 10 may operate together or individually at a first configuration step 90 in which the name of each beacon 22 and beacon profile information is entered linking each beacon's unique user or object identification to identity information further provided to the virtual assistant 12. This data entry may be done through the virtual assistant 12 by vocal command or through an application program on the user's phone or computer. In this process, the user is encouraged to identify each beacon 22 to a unique name of an individual and to provide additional information about that individual, for example, gender and age of the individual which make up the profile information. The beacon 22 need not be associated with a person but may also be associated with an object in which case the name of the object and object type is entered linking each beacon's unique user or object identification to identity information further provided to the virtual assistant 12. The object type can be entered through a set of menus so that the system can make use of a preprogrammed understanding of the context of the object (for example, whether it is portable, particularly to locations where it is likely to be used, whether it can move on its own, and whether it is likely to be removed from the residence). This information can help in the mapping process that is described below.

At next process block 92, similar data is entered for the sniffers 20 and the hub 16. In this case, during the profile data entry, the user is encouraged to provide names for the sniffers 20 and hub 16 that can assist in establishing a likely location of the sniffers 20, for example, as would be the case in the names of "kitchen near the refrigerator" or "kitchen near the stove" or "living room on the west wall" or "Tiffany's bedroom on the east wall," where the name of the location may be selected from the names given to the beacons 22 to provide additional information to aid in mapping. Again, a menu-type user interface (visual or spoken) can guide the user to provide detailed information of this kind.

Optionally at this point a user may be prompted to enter data about the floorplan of the residence. At a minimum this data may simply list the rooms on different floors but in some embodiments a graphic interface may also be provided allowing the user to generate a rough floorplan of their living space. Ideally this step is not required as will be discussed below.

The sniffers 20 and hub 16 are then paired (to establish the mesh network and receive the profile data from the virtual assistant 12 or hub 16) and moved to their stationary locations. Once installed and receiving power, each sniffer 20 is triggered to communicate with multiple other sniffers within range (for example, at least 20 meters limited by interfering walls and structures) to make measurements of communication signal strength that roughly indicate separation distance.

At this point, and as indicated by process block 94, the virtual assistant system 10 may begin a heuristic mapping process where the location of the sniffers 20 and of the beacons 22 when detected by the sniffers 20 is refined to build a continually refined model of the environment without the need for the user to construct a specific map to provide location information. This mapping process is not limited to measurement of signal strength but may also make use of identified voice signals and environmental data as will be discussed below.

A map developed by the heuristic mapping process of process block 94 may then be used at process block 96 to track the current locations of each beacon 22, for example, from tri-lateralization and/or machine learning of beacon signal strength (indicated by arrow 102) as well as the environmental and other sensed data discussed (indicated by arrow 100) above which not only contributes to the mapping process but can be used in the localization process. Voice-recognition using received voice signals, as indicated by arrow 98, may also be used to augment the location of the individual using tag data 102 when there is ambiguity in the location, or, vice versa, tag data 102 may be used to augment voice-recognition when there is ambiguity in identifying an individual's voice. These two features may be used in combination for a two factor authentication system in which tag location determined by tri-lateralization and/or machine learning is compared with voice-recognition to provide/permit certain activities only when these two identifications match at a single location. This can help address the problem of someone wearing someone else's tag and attempting to spoof the system.

The environmental data indicated by arrow 100 may, for example, also be used to augment the tracking of location per process block 96 by sensing changes in humidity and temperature with the presence of individuals or by a fire or flood condition, changes in air pressure caused by opening or closing of doors indicating an entry or exit to a particular room, or the use of beamforming techniques with a microphone array sensing sound pressure level in each static sniffer microphone to locate a speaker within the space with more precision than is available with simple sound volume measurements. This can help address the situation of users who are not wearing tags, but their presence may be sensed through environmental data such as body heat.

The current locations of the beacons 22 may be tracked over time to provide a trajectory of the user as indicated by process block 101 to track the dynamic movements of each beacon 22, for example, through dead reckoning, software/machine learning algorithms, tri-lateralization or other navigational techniques. Beacon data indicated by arrow 103 may be used to provide navigation cues using received accelerometer and rotational gyroscope signals from the gyroscope 73, rotational accelerometers, multi-axis accelerometer 75 and environmental data from the environmental sensor array 71 sensing changes in temperature, barometric pressure, air quality and humidity detection when the user is in motion. The trajectory of the user and changes to the room environment, such as humidity, temperature and air pressure may be used to anticipate future user location.

At various times a "request" may occur as indicated by decision block 104 related to information desired by the user where user location and identity has significance. This type of request may include a general interaction 106 with the Internet 14 through the virtual assistant 12 (for example, the user requesting streaming of music to a device where the device may be inferred by location). Similarly, location can be important in a request such as "open the blinds" which take their context from a known location of the individual. Location information can also augment requests that do not require control of devices associated with the house, for example, in an abstract question like "what planet am I seeing in the sky outside my window" where knowing the direction of the window could provide additional information in preparing a response. The trajectory of the user can be used to augment requests and anticipate future user location in a room, for example, reminding the user to "remember your keys" as the user heads in a trajectory toward the door to leave the room.

Normally, the virtual assistant 12 will respond only to a trigger word/keyword, i.e. "Alexa", however knowledge of the individual's location and identity allows requests to be triggered simply by location information and/or a user's identity particularly when there are standing rules or a push notifications schedule. The user's identity may be associated with worn beacon 22 but may also be distinguished by an individual's voice through the microphone array 32 communicating with the virtual assistant 12 when beacons are not being worn, as previously described above. In some instances, the user's identity may be identified as an "unknown identity", for example, if the individual's identity has not been linked to identity information linked to the worn beacon 22 or the individual's voice, and the camera 33 communicating with the virtual assistant 12 may be activated to identify the unknown user's image and, for example, alerting and sending the image to the user where the unknown individual may be identified.

Besides the standard virtual assistant-type queries currently available in virtual assistants, the request may be a location specific request 108, for example, "where are my keys" where the identity information of the keys in question have been associated with beacon 22 or the unique user or object identification of beacon 22 or "where is a particular individual within the house" where the identity information of the particular individual has been associated with beacon 22 or the unique user or object identification of beacon 22. Such location specific requests 108 can also relate to specialized location services provided by the hub 16, for example, displaying (on a user's cell phone or the like) a plot of the trajectory of an individual superimposed on the floorplan showing the location of an individual moving through the house or environment within a certain time range, for example, the last 24 hours, such as can be implemented by the present invention. Such trajectories can be useful for locating misplaced objects when that object is not associated with the beacon. Location information can allow the virtual assistant 12 to use remote speaker systems like an intercom allowing communication to an individual on a point-to-point basis based on knowledge of the location of the two communicating individuals in the form of a smart intercom where other speakers and microphones are not activated.

Finally, the request may be a location background task 110, for example, generating requests at regularly scheduled intervals or upon the occurrence of certain events. The selected location tasks 110 are possible because of location information gathered by the present system which may include, for example, automatic monitoring of an individual. For example, a child having a beacon 22 may be monitored with respect particular locations that may prove a danger or with respect to particular mobile devices that have also been tagged with beacon 22. Such monitoring, for example, may generate a warning if the child is too close to the stove or too close to the stairs that lead to the basement. Similarly, a beacon 22 on a pet may indicate when the pet is in a location where the pet should not be and trigger an appropriate notification. The system may also provide push notifications related to trigger events depending on the user's location and/or the user's identity, for example, suggesting activities to the user based on the user's location being in the living room where a TV exists (such as would propose TV-based activities).

In an emergency situation, for example, fire or the like, the system may be triggered to provide location information for each individual and instructions as to the best way of exiting the houses. Similarly, the use of the PIR (passive infrared detection) and other environmental detectors allows the detection of individuals without beacons, for example, third-party service people, package delivery people, or possible intruders, each person readily distinguished from beacon-holding individuals. Thus, for example, false triggering by individuals in the house and their pets can be virtually eliminated in an alarm system using the monitoring of infrared signals of individuals. The ability to determine beacon location and individual locations near locked or secure locations and the like can provide a second factor of authentication in the opening of those locks or the use of computer systems.

Figure 7:
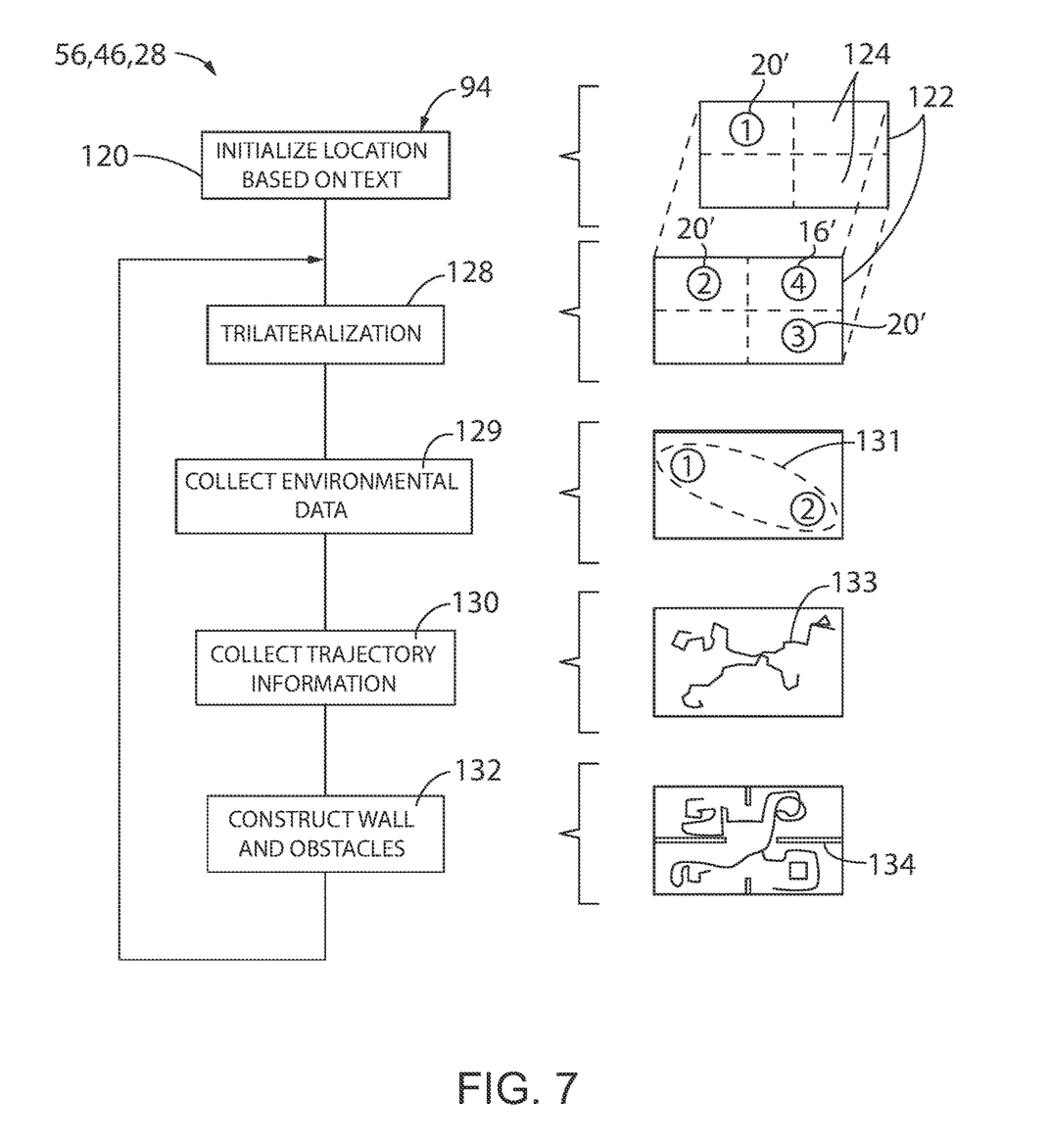
FIG. 7 is a detailed flowchart of the heuristic mapping process and diagrams showing that operation.

Referring now to FIG. 7, as noted above, the present invention uses a heuristic mapping to simplify initialization of the system by the consumer limiting the need for lengthy mapping steps. Such a heuristic mapping can operate without requiring a floorplan be entered by the user although such a floorplan may be provided as well as other specific residence descriptors, these being as simple as a set of questions indicating, for example, the type of residence (apartment, house, etc.), the number of rooms (possibly including room names and the like), and relative positions of the rooms (east, northwest, etc.).

As indicated by process block 120, the heuristic mapping of process block 94 of FIG. 6 may begin by analyzing the locations of each sniffer 20 and the hub 16 provided at process block 90 of FIG. 6. At a minimum, this can be done randomly by distributing these elements (indicated by hub marker 16' and sniffer marker 22') on a hypothetical floorplan 122, for example, being a rectangular area with the hub marker 16' and sniffer markers 22' regularly spaced on a rectangular grid. With additional information input by the user, for example, the number of floors and the number and names and locations of the rooms, this model floorplan 122 may be expanded and general room locations 124 may be added which allow localization of the hub marker 16' and sniffer markers 22'. Alternatively, or in addition, information gleaned from the names assigned to the hub 16 and sniffers 20 may be used to separate the hub marker 16' and sniffer markers 22' into separate rooms 124 and within the separate rooms 124 as guided by directions such as "West" or "East" in the names of the hub marker 16' and sniffer markers 22'. Each enumerated room 124 can be initially modeled as an equally spaced zone 124 here shown simply as rectangular regions. The initial "trial" location of the zones 124 may be arbitrary at this point in time.

At process block 128 tri-lateralization and/or machine learning may be implemented by each of the sniffers 20 using the mesh network signal strengths between each sniffer 20 and/or the signal strength of individual sniffers 20. This tri-lateralization will provide an apparent separation between each of the sniffers 20 and hub 16 based on a simple empirical formula for signal drop-off with distance. This simplified distance information may be compared to the initial trial location of the elements 22' and 16' to see if those locations are consistent with the measured signal strength within a predetermined error. If not, the trial locations may be moved about iteratively, with each step invoking a testing whether the tri-lateralization is consistent with the placement of the elements 22' and 16'. This iterative process, for example, may use a set of parallel trial locations and select among those or, for example, may use hill climbing, Monte Carlo or simulated annealing techniques which makes light movements in the elements to improve consistency. Ultimately, at the conclusion of this process, a stable approximate location of each element 22' and 16' will be reached. This stable approximation may be further refined as will be discussed below and may not reflect the actual locations of the hub marker 16' and sniffer markers 22' for a number of reasons including the existence of multiple consistency solutions, local maximums, and/or distortions of the signals by signal loss walls and the like.

Next, and also at process block 128, tri-lateralization and/or machine learning is performed on any beacons in the region. Again, the modeled location of the sniffers 20 and hub 16 are compared against this tri-lateralization data to see if it is consistent with a single location of a given beacon 22, that is, whether the signal strengths from an individual beacon 22 can be reconciled with the hypothetical location of the sniffers 20 and the hub 16. If not, the assumed locations of the hub 16 and sniffers 20 are iteratively adjusted by one of the techniques described above also using this new tri-lateralization data from the beacons 22.

At process block 129, environmental data is collected including indications of the presence of a user measured by the PIR sensor, accurately locating the proximity of the user to a particular sniffer 20 and, for example, temperature and humidity measurements (deviating from those measurements of other distant sensors) indicating a more general location of the user within an enclosed space. Slight changes in barometric pressure, for example, allow determination of floor heights. A room light sensor can be used to localize a particular sniffer 20 into a unique room or a common room 131 with other sniffers 20 if they can also see a correlated sudden change in illumination.

At process block 130, once the location of the sniffers 20 and hub 16 have stabilized with a predetermined degree, trajectories 133 of the beacons 22 are collected indicating the paths of individuals throughout the residence. These paths can be used to further refine the locations of the beacons 22 and hub 16 by identifying sudden changes in trajectory velocity that reflect radiofrequency signal aberrations (caused by reflections and/or absorption by materials) that produce a distorted map by creating apparent increased distances where signals are absorbed. This distortion is identified by analysis of abrupt changes in apparent in velocity. The absence of trajectories in certain locations may also be used to signal possible obstacles such as walls or the like. Beacon data 103 from various sensors of the beacons 22 may also be used to determine the trajectories 133 of the beacons 22.

Based on the trajectories at process block 132, walls 134 and other obstacles can be added into the map to provide an improved iterative location of the sniffers 20 and hub 16 using the walls as attenuators to better refine a model consistent with these measurements. The result is a continuously developing map of the environment providing increased precision of locating the individuals. At any point, a map may be displayed to the user for additional refinements or labeling.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A virtual assistant system comprising:
a virtual assistant at a first stationary location providing audio communication in a room with a user in the room through a microphone and a speaker and communicating over an Internet with a remote server to receive requests for information from the user and to communicate with the remote server to provide responsive information to the user through the speaker:
a sensor system for identifying a second location of the user, the second location of the user is independent of the first stationary location of the virtual assistant, and identifying an identity of the user within the room and providing identity information and location information to the virtual assistant wherein the sensor system includes (a) at least one sniffer at a fixed location within the room and having a transceiver adapted to receive dynamic signals indicating a location of the user as the user moves within the room and (b) a wearable beacon adapted to be carried by the user delivering the dynamic signals measurable by the at least one sniffer to deduce the location information;
whereby the virtual assistant uses each of the identity information and the location information together with the requests for information to respond to user requests;
wherein the sensor system generates a mapping of the room with based on a history of the location information of the user over time as the user moves around the room and based on the at least one sniffer receiving the dynamic signals from the wearable beacon worn by the user to provide floorplan information of the room to the virtual assistant.

2. The system of claim 1 wherein the sensor system includes at least one central interface, wherein the central interface has a processor communicating with the at least one sniffer and the virtual assistant and a memory communicating with the processor and holding a program executable by the processor to identify the location of the user based on the signals and to provide the location to the virtual assistant.

3. The system of claim 2 wherein the at least one sniffer includes at least one sensor selected from a microphone, a light sensor, a passive infrared sensor, an active infrared sensor, and an environmental sensor detecting at least one of a temperature, barometric pressure, air quality and humidity.

4. The system of claim 3 wherein the program executable by the processor identifies the location of the user based on a change in at least one of a temperature, barometric pressure, air quality and humidity from the sensor of the at least one sniffer.

5. The system of claim 3 wherein the program executable by the processor identifies the location of the user based on voice signals from the microphone of the at least one sniffer.

6. The system of claim 1 wherein the at least one sniffer includes an identification indicating a location of each sniffer and recognizable by the virtual assistant.

7. The system of claim 1 wherein the beacon transmits an identification signal to the sniffers indicating the identity of the user or object carrying the beacon and recognizable by the virtual assistant.

8. The system of claim 1 wherein the signal is a Bluetooth signal.

9. The system of claim 1 wherein the beacon further includes at least one of an accelerometer and a gyroscope wherein the sensor system identifies the location of the beacon by inertial guidance using signals of the at least one accelerometer and gyroscope.

10. The system of claim 1 wherein the beacon further includes an environmental sensor detecting at least one of a temperature, barometric pressure, air quality, and humidity wherein the sensor system identifies the location of the beacon using predictive algorithms based on a change in at least one of a temperature, barometric pressure, air quality and humidity.

11. The system of claim 1 wherein the at least one sniffer are positioned in an electrical switch or outlet plates and connectable to a local electrical power line.

12. The system of claim 1 wherein the at least one sniffer is one sniffer and the location information of the user is deduced by the one sniffer only.

13. The system of claim 1 wherein the dynamic signals are powered by a long life battery carried by the user.

14. A method of using a virtual assistant at a first stationary location comprising:
using a sensor system at a second location of a user independent of the first stationary location of the virtual assistant to locate the user within a room and to provide information to the virtual assistant about an identity of the user and a location of the user within the room wherein the sensor system includes (a) at least one sniffer fixed in location with respect to the room and having a transceiver adapted to receive dynamic signals indicating the location of the user as the user moves within the room and (b) a wearable beacon adapted to be carried by the user delivering the dynamic signals measurable by the at least one sniffer to deduce location information wherein the dynamic signals are of a predetermined signal strength measurable by the at least one sniffer to deduce distance;

generating a mapping of the room based on a history of location information of the user over time as the user moves around the room and based on the at least one sniffer receiving the dynamic signals from the wearable beacon worn by the user to provide floorplan information of the room to the virtual assistant;

receiving a request for information by the user through the microphone of the virtual assistant;

combining the request for information by the user with the mapping of the room to create an augmented request for information; and responding to the augmented request for information by the virtual assistant.

15. The method of claim 14 further comprising:

receiving by the virtual assistant a request as to the location of the user or an object within the area by the user through the microphone of the virtual assistant;

responding to the request for information by the virtual assistant.

16. The method of claim 14 further comprising providing automatic alerts by the virtual assistant based on trigger events combining location information and identity information from the sensor system.

17. A mapping system adapted to communicate with a virtual assistant at a first stationary location providing audio communication in a room with a user through a microphone and a speaker and communicate over an Internet with a remote server to receive requests for information from the user and to communicate with the remote server to provide responsive information to the user through the speaker comprising:

a sensor system for identifying a second location of the user independent of the first stationary location of the virtual assistant and identity of the user within the room and providing identity information and location information to the virtual assistant and providing a layout of obstacles and walls of the room based on a history of locations of the user within the room over time as the user moves around the room and based on the at least one sniffer receiving the dynamic signals from the wearable beacon worn by the user to provide floorplan information of the room to the virtual assistant, including at least one sniffer at a fixed location within the room and having a transceiver adapted to receive signals indicating the identity of the user and location of the user recognizable by the virtual assistant and wherein the at least one sniffer includes an identification indicating a location of each sniffer recognizable by the virtual assistant; and a central interface having a processor communicating with the transceiver and the virtual assistant and a memory communicating with the processor and holding a program executable by the processor to identify the identity of the user and the location of the user based on the signals and to provide the identity information and location information to the virtual assistant whereby the virtual assistant uses each of the identity information and location information together with the requests through the microphone to respond to user queries.

\* \* \* \* \*